United States Patent
Takahashi et al.

(10) Patent No.: US 6,347,185 B1
(45) Date of Patent: Feb. 12, 2002

(54) APPARATUS AND METHOD FOR RECORDING AUDIO/VIDEO SIGNAL AND DETECTED FEATURE INFORMATION THEREOF

(75) Inventors: Takao Takahashi, Tokyo; Toshiya Akiba; Naohisa Arai, both of Kanagawa; Masami Tomita, Chiba; Masashi Ohta, Tokyo; Noboru Murabayashi, Saitama; Taro Suito, Kanagawa, all of (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 08/988,525

(22) Filed: Dec. 10, 1997

(30) Foreign Application Priority Data

Dec. 13, 1996 (JP) .............................. 8-333422

(51) Int. Cl.[7] .............................. H04N 5/76; H04N 5/92
(52) U.S. Cl. .............................. 386/95; 386/96; 369/1
(58) Field of Search .......................... 386/6–8, 39, 54, 386/95, 96–107, 68–70, 75; 360/72.1, 72.2, 27, 13, 32, 48; 369/47, 48, 1, 54, 58; H04N 5/76, 5/92, 9/79

(56) References Cited

U.S. PATENT DOCUMENTS

| | | | | |
|---|---|---|---|---|
| 4,583,132 A | * | 4/1986 | Nakano et al. ............... | 386/97 |
| 5,377,167 A | | 12/1994 | Maeda et al. | |
| 5,576,843 A | | 11/1996 | Cookson et al. | |
| 5,613,032 A | * | 3/1997 | Cruz et al. .................... | 386/69 |
| 5,930,451 A | * | 7/1999 | Ejiri ............................. | 386/98 |
| 6,061,496 A | * | 5/2000 | Nakamura et al. ............ | 386/98 |

FOREIGN PATENT DOCUMENTS

| | | |
|---|---|---|
| EP | 0 510 876 | 10/1992 |
| EP | 0 521 487 | 1/1993 |
| EP | 0 597 339 | 5/1994 |
| EP | 0 644 692 | 3/1995 |
| EP | 0 696 798 | 2/1996 |
| EP | 0 795 870 | 9/1997 |
| WO | WO94/14277 | 6/1994 |

OTHER PUBLICATIONS

Patent Abstracts of Japan, vol. 1996, No. 04, Apr. 30, 1996 & JP07–334978 (Dec. 22, 1995).

* cited by examiner

*Primary Examiner*—Thai Tran
(74) *Attorney, Agent, or Firm*—Frommer Lawrence & Haug LLP; William S. Frommer; Glenn F. Savit

(57) ABSTRACT

A recording apparatus configured to receive analog video and audio signals, digitize and compress the same, and record the compressed audio and video signals on a digital recording medium such as an optical disk. As the audio and video signals are received and recorded, time segments of the audio signals are analyzed for certain features such as whether the time segment corresponds to instrumental music, vocal music or conversational speech. A table of contents is then generated corresponding to the feature analysis and digitally stored on the storage medium. As a result, the recorded audio is characterized over time, e.g., on a frame by frame basis. A high degree of versatility is thereby provided in the playback process, such as the ability to skip portions having certain audio types or to quickly scroll to desired portions of the recorded audio programs. Reproducing apparatuses enable the user to selectively reproduce segments of the recorded audio and video.

23 Claims, 13 Drawing Sheets

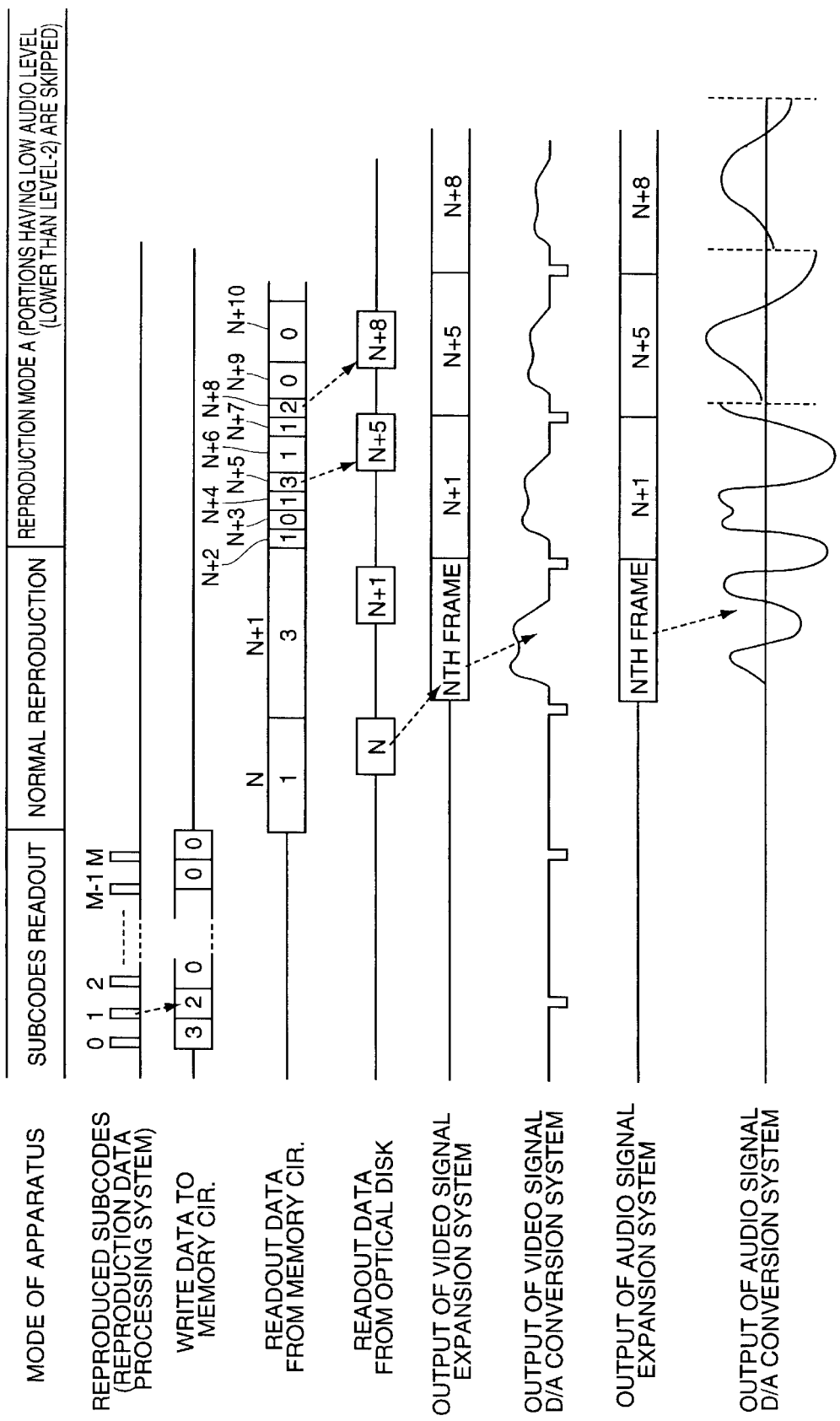

APPARATUS AND METHOD FOR RECORDING AUDIO/VIDEO SIGNAL AND DETECTED FEATURE INFORMATION THEREOF

FIELD OF THE INVENTION

The present invention relates generally to information recording and reproduction, and more particularly, to recording audio and video signals or the like together with additional information related to those signals, and selectively reproducing the audio/video signals based on the additional information.

BACKGROUND OF THE INVENTION

Presently, analog-type video tape recorders (VTRs) are commonly used to record and reproduce analog video and audio signals of a television broadcast. It is contemplated that digital data corresponding to such analog video and audio signals will be commonly recorded on a digital storage medium such as an optical disk or a magnetic hard disk.

With conventional VTRs, reproduction is facilitated by introducing various identifying signals during the recording process. For example, one type of identifying signal is used to identify whether a television broadcast is a bilingual broadcast or a stereo broadcast. As a result, a television receiver can discriminate between these two types of broadcasts and control the audio signal output method accordingly.

Contemporary optical disks and hard disks have superior accessibility, i.e., random access capability, as compared to analog magnetic tapes. As such, various fast viewing and listening methods are now being considered for these disks, such as speech speed conversion and selective skipping of song contents. In contrast, conventional VTRs lack such capability. Some prior art VTRs include an automatic audio selection function or the like, while others have a speech speed conversion feature. A drawback of the speech speed conversion feature, however, is that video and audio are processed independently. This is problematic in that the output audio and video may become unsynchronized, resulting in unnatural audiovisual output, e.g., lips moving before or after the audio is produced.

Conventional laser disc players ("LDPs") are capable of header search for karaoke use (i.e., for use in a sing-along machine). However, in the case of ordinary broadcasts, users in many instances desire to view conversational-type programs between musical performance programs. In these cases, the conventional LDP, which is capable only of header search, is inadequate.

OBJECTS AND SUMMARY OF THE INVENTION

It is, therefore, an object of the present invention to provide a recording apparatus capable of recording an audio or audiovisual signal on a digital storage medium, while concomitantly analyzing its characteristics over time for particular audio types and storing information indicative of such characteristics on the storage medium.

It is a further object of the invention to provide a reproduction apparatus that allows for selective reproduction of the audio or audiovisual signal so recorded based on user selection of a particular audio type.

It is another object of the invention to provide recording and reproduction apparatuses with enhanced features.

In an illustrative embodiment of the invention, there is provided an information recording apparatus for recording at least an audio signal onto a recording medium, which includes detection circuitry for detecting a feature of the audio signal, and recording circuitry for recording together with the audio signal additional information that corresponds to the detected feature. Preferably, features of the audio signal are detected in a time-segmented manner, such that segments or frames of the audio signal are each characterized. For example, features that may be detected by the detection circuitry may include: whether a given segment comprises muted audio; whether it comprises music; or whether it comprises conversational speech.

With the feature information stored on the recording medium, versatility during reproduction is advantageously possible, thereby providing the user with a highly versatile tool during playback. For instance, the user is able to skip portions of the recorded material having an undesired audio type or types, or to quickly locate a desired portion of the recorded material by selective skipping based on audio types.

In another illustrative embodiment, there is provided an information reproduction apparatus for reproducing at least an audio signal corresponding to audio data recorded on a recording medium on which additional information relating to at least the audio signal is also recorded. The apparatus includes reading means for reading out a portion of the additional information prior to any reproduction of a corresponding portion of the audio signal; determining means for determining whether to reproduce the corresponding portion of the audio signal in accordance with the read-out portion of the additional information and a current operating mode; and control means for controlling reproduction of the corresponding portion of the audio signal in accordance with a determination by the determining means.

BRIEF DESCRIPTION OF THE DRAWINGS

The following detailed description, given by way of example and not intended to limit the present invention solely thereto, will best be appreciated in conjunction with the accompanying drawings, in which like reference numerals denote like elements and parts, wherein:

FIG. 13 is a timing diagram showing output timing of signals flowing within the respective processing systems of FIG. 11.

DETAILED DESCRIPTION OF CERTAIN PREFERRED EMBODIMENTS

Figure 1:
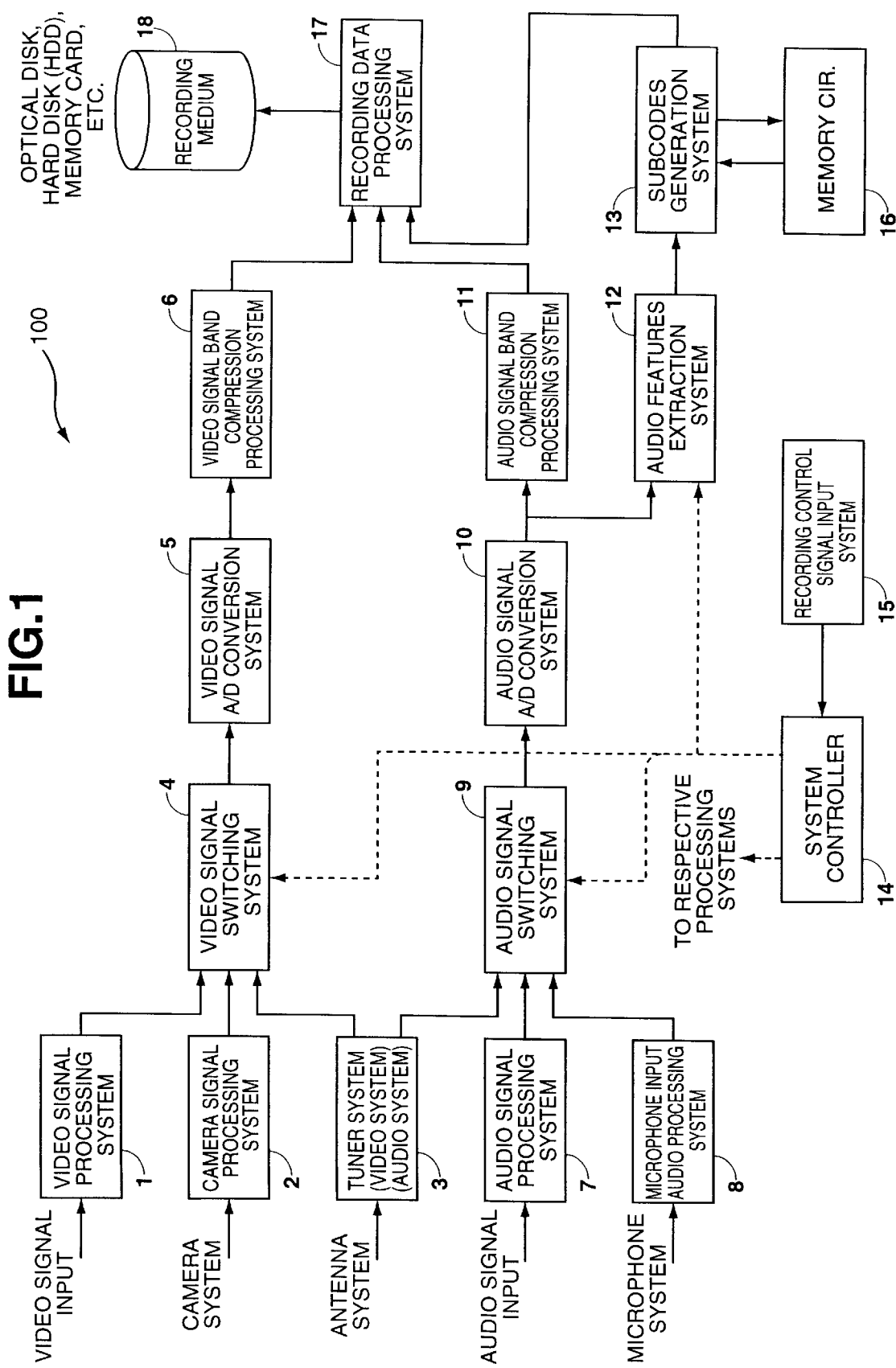
FIG. 1 is a block diagram of an illustrative configuration of an information recording apparatus according to an embodiment of the present invention.

FIG. 1 is a block diagram of a first illustrative embodiment of the present invention, designated as recording apparatus 100. As will be described in detail below, recording apparatus 100 is configured to selectively receive various types of analog input signals, such as a television broadcast signal or a camera system output signal. The apparatus converts the selected input signal to a digital signal, and compresses and records the same on a digital storage medium such as an optical or magnetic disk. As the audio and video signals are received and recorded, characteristics of the audio signal are analyzed over time so as to categorize its contents in a time-segmented manner. In particular, individual frames of the audio signal are analyzed to determine which frames or frame sequences correspond to, e.g., music, conversational speech, or muted audio. Each segment of the recorded audio program is thereby categorized. A user table of contents is then generated corresponding to the categorization of the audio signal. The table of contents is recorded onto the digital storage medium, either in a specific region of the recording medium, or distributed as subcodes in the same regions as the recorded audio/video data. The table of contents allows a user to play back a selected type of audio and associated video data while skipping other types, or to quickly access desired portions of the recorded audiovisual program by selective skipping of certain audio types, and so forth.

Recording apparatus 100 will now be described in detail. Video signal processing system 1 is configured to receive an external input video signal, such as a VTR video output, and perform various kinds of processing on the signal such as automatic gain control (AGC). A camera signal processing system 2 operates to receive a video signal from a charge coupled device (CCD) camera or the like and convert it into a standard protocol signal such as a National Television System Committee (NTSC) video signal. Tuner system 3 receives a television broadcast signal via an antenna system (not shown), and converts a selected channel of the television signal into video and audio signals through video detection, video amplification and audio detection.

Audio signal processing system 7 is adapted to receive and amplify an external audio signal, e.g., the audio output from the VTR supplying the video signal to system 1. A microphone input audio processing system 8 amplifies an audio signal inputted through a microphone and performs AGC processing thereon.

The video output signals from each of systems 1, 2 and 3 are applied as inputs to video signal switching system 4, which switches a selected one of the video signals to its output in accordance with a selection control signal from system controller 14. Likewise, audio signal switching system 9 routes the selected one of the audio signals from systems 3, 7 and 8 to its output based on the control signal from system controller 14.

In the video path, the analog video output of switching system 4 is applied to video signal A/D conversion system 5 where it is converted to a digital video signal and then quantized. The quantized, digital video signal is then compressed by video compressing and processing system 6 in accordance with a standard compression protocol such as the joint photographic experts group (JPEG) or the moving picture experts group (MPEG) schemes. The compressed video signal is applied to recording data processing system 17 and recorded in recording medium 18 as will be discussed more fully below.

In the audio path of recording apparatus 100, the analog audio output of audio switching system 9 is converted to digital audio signal by audio signal A/D conversion system (A/D converter) 10. The digitized audio output from A/D converter 10 is applied to both an audio features extraction system 12 (detecting means) and to an audio signal band compression system 11, the latter of which compresses the audio when necessary in accordance with a standard protocol such as MPEG.

Audio features extraction system 12 includes processing circuitry to analyze certain characteristics of the digital audio signal applied thereto from system 10, to thereby extract audio features from the signal. The quantized audio signal is quadrature—transformed in extraction system 12 based on operating parameters supplied thereto from system controller 14, and then subjected to a specified operation in accordance with an operating command also supplied by system controller 14. The audio signal is analyzed in extraction system 12 on a block by block basis, where each block corresponds to a specific time segment (e.g., frame or set of frames) of the audio signal to be recorded. By way of example, to determine which portions of the audio signal correspond to a mute condition, the audio signal may be analyzed in 0.02 second blocks to determine which blocks contain muted or low level audio. The audio signal is analyzed over larger blocks of time to determine which of the larger blocks contain audio corresponding to, e.g., instrument music, human speech or vocal music. Based on the results of the analysis performed by extraction system 12, subcodes are generated by a subcodes generation system 13 to characterize each such block of the audio signal. Certain subcodes are temporarily stored within memory 16.

In particular, for each audio block of duration "D1" (e.g., 0.02 seconds duration), a subcode "A" is generated as indicative of whether or not that block corresponds to muted audio. For each block of a longer duration "D2", a subcode "B" is generated which is indicative of the type of audio contained in that block, e.g., conversation, instrument music or vocal music. Subcodes A are directly transferred to recording data processing system 17, whereas subcodes B are transferred to memory circuit 16 for temporary storage therein. Typically, when recording of audio/video data is complete, all subcodes B are transferred as a block from memory 16 to recording data processing system 17 (via subcodes generation system 13) under the control of system controller 14.

Figure 2:
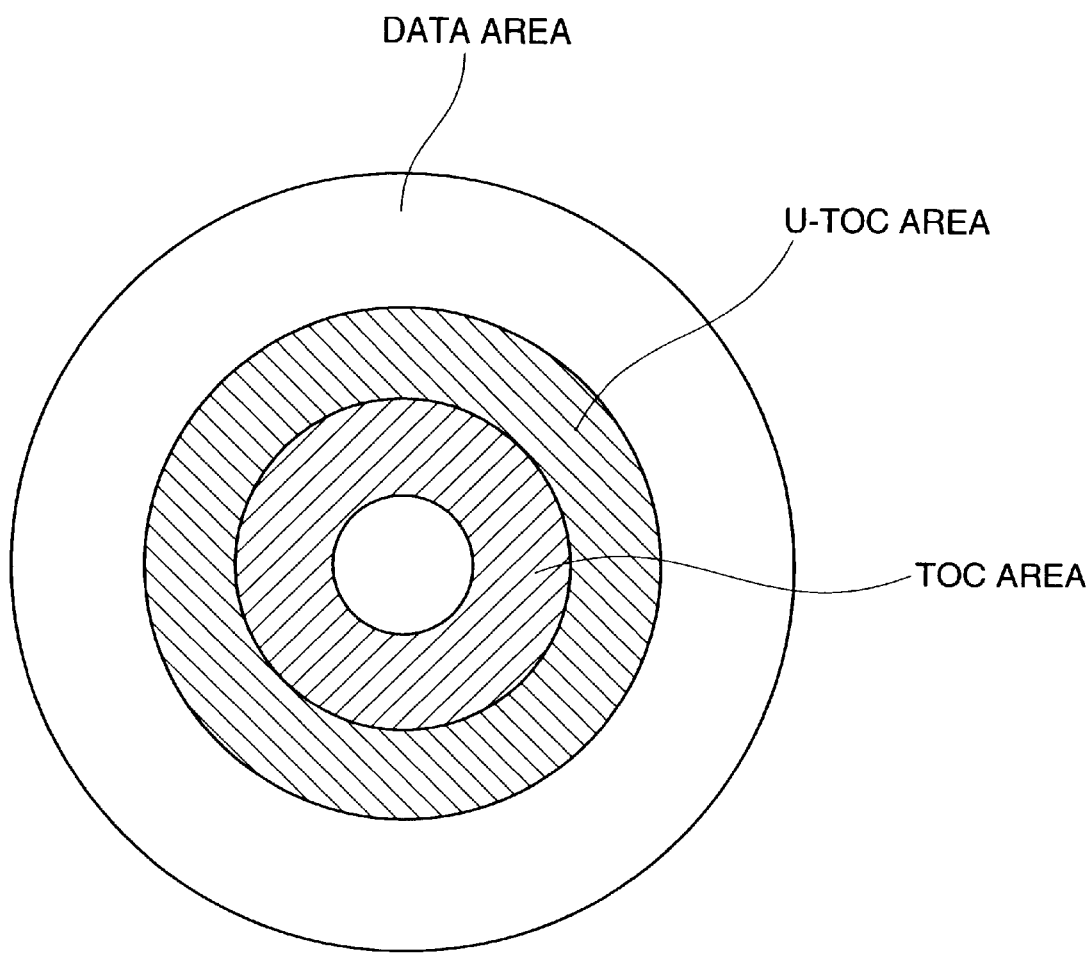
FIG. 2 illustrates an illustrative arrangement of storage regions on a disk.

In any event, as the analog audio signal is received by recording apparatus 100, it is digitized, compressed and recorded as data, generally in real time, on a predetermined portion of the recording medium 18. As the subcodes A and B are generated, a user table of contents (U-TOC) is generated to correlate the audio data being stored on recording medium 18 with the subcodes characterizing the respective segments of the audio data. The U-TOC is stored on recording medium 18. As shown in FIG. 2, the digitized audio data may be recorded on the outermost region of the disk, and the U-TOC data may be recorded on a predetermined area of the disk outside the innermost region where a table of contents (TOC) is recorded.

System controller 14 is configured to control the respective processing systems by supplying control signals thereto based on a user's instruction inputted through recording control signal input system 15, e.g., a keyboard or the like.

Recording data processing system 17 (recording means) operates to multiplex bit sequences that are supplied from video compression system 6, audio compression system 11, and subcodes generation system 13, and to transfer the multiplexed data to recording medium 18 and record the data thereon. (It is noted that some or all of the subcodes may optionally be transferred as a block without being multiplexed with the audio and video data, in which case recording system 17 just records the block of subcodes on the recording medium without multiplexing). Recording medium 18 may be an optical disk, a hard disk, a memory card, or the like.

Figure 3:
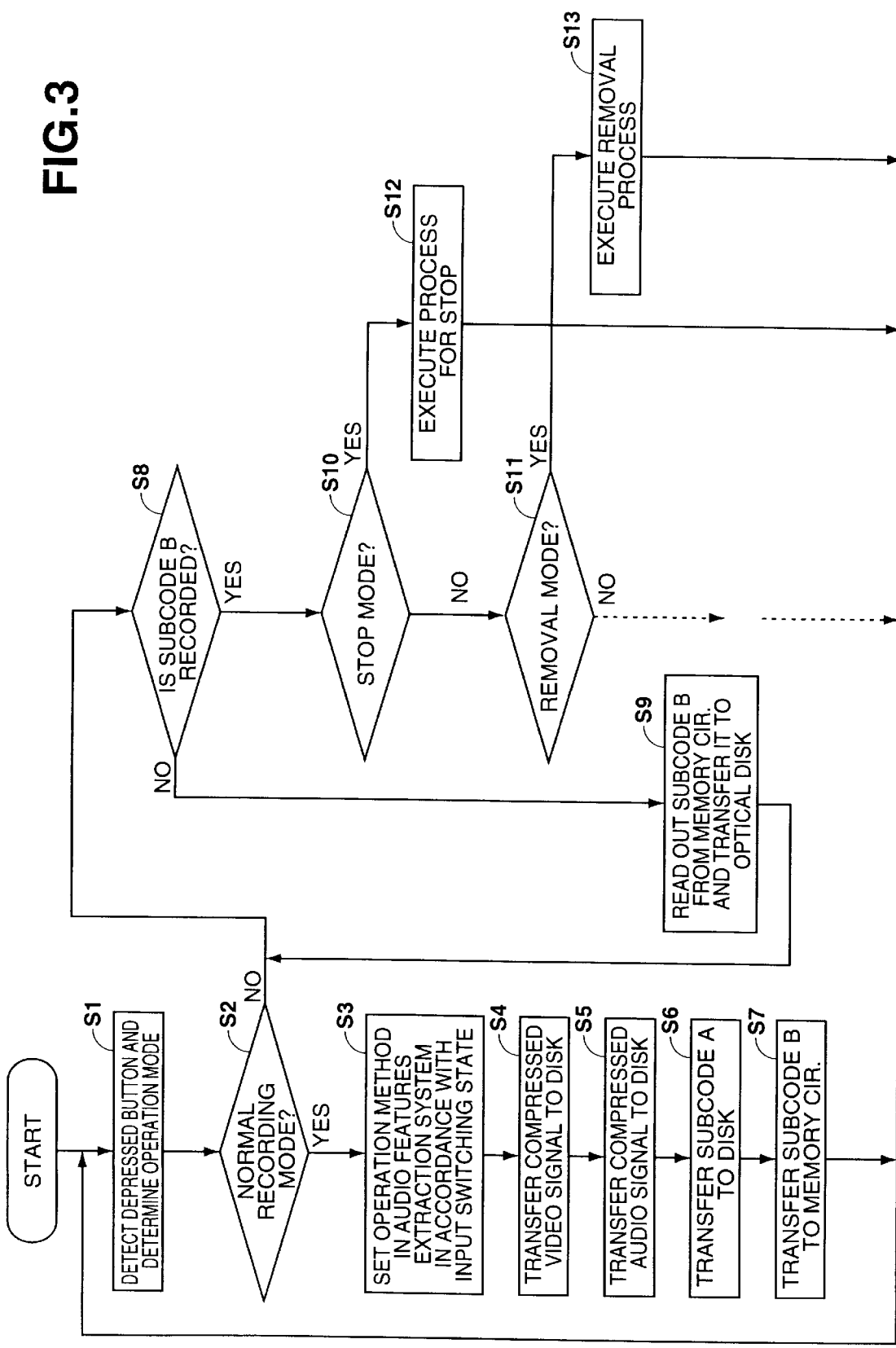
FIG. 3 is a flowchart showing the operation of the information recording apparatus of FIG. 1.

FIG. 3 is a flowchart illustrating process steps executed within system controller 14 to control various aspects of the recording process of recording apparatus 100. At the outset (step Si) system controller 14 determines an operating mode based on a user's instruction input to input system 15, e.g, by detecting depression of a particular mode key. In step S2, it is ascertained whether the operating mode determined in step Si is a normal recording mode, i.e., a mode in which both video and audio signals are recorded. If so, the routine proceeds to step S3, where system controller 14 sets operation parameters A, B, C, and D in the audio features extraction system 12. For reasons that will become apparent below, the values of parameters A–D are set in accordance with the type of audio signal selected by the user, e.g., audio signal from a television signal, VTR output or microphone. Thus, the values of parameters A–D correspond to the switching state of audio switching system 9, which is controlled by system controller 14.

Figure 4:
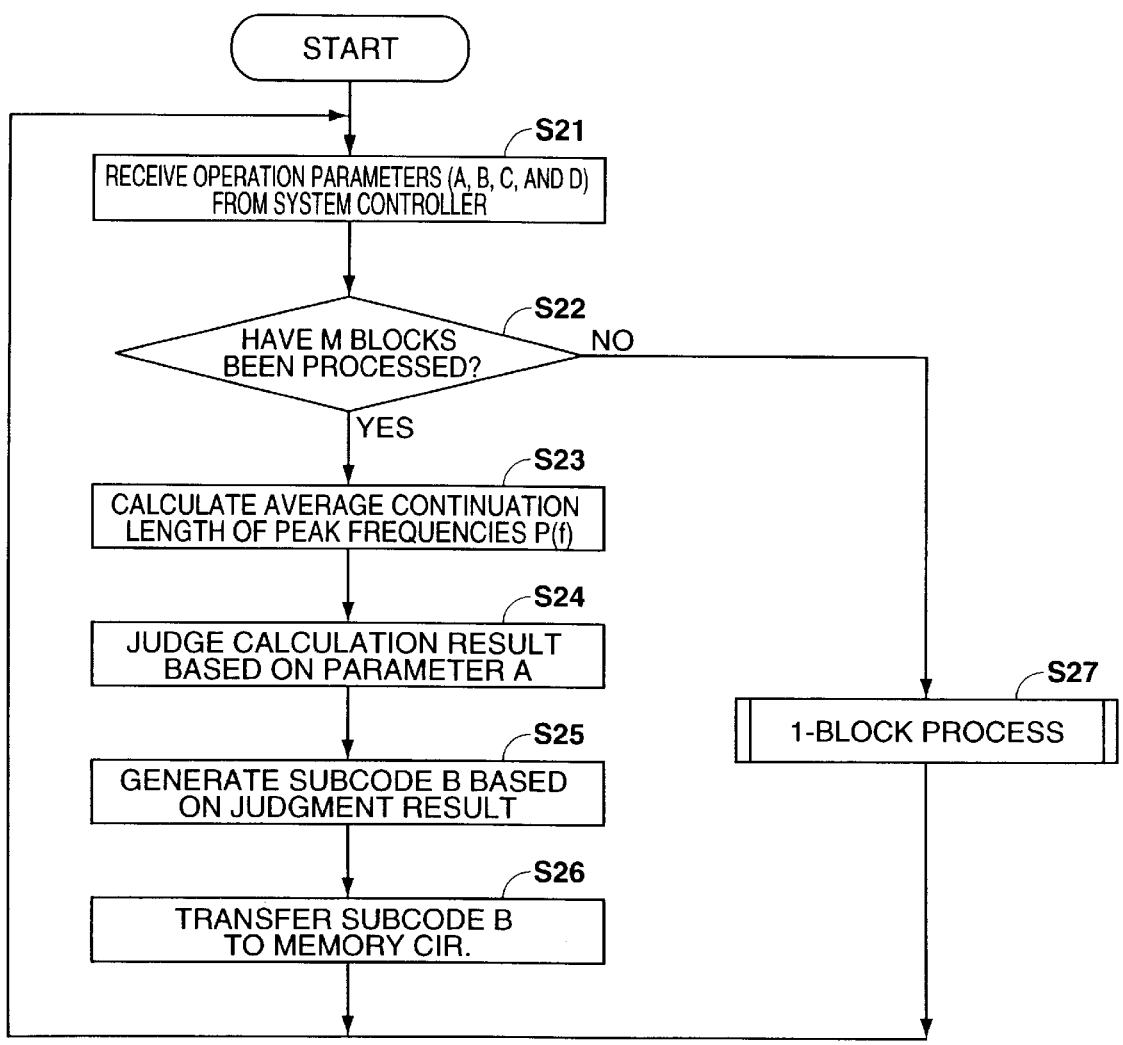
FIGS. 4 and 5 are flowcharts showing a process of generating a subcode indicative of an audio feature.

Before proceeding further with FIG. 3, reference is made to FIG. 4 which shows a flowchart illustrating a routine within audio features extraction system 12 and subcodes generation system 13. For the presently described embodiment, it is assumed that one data block contains N bits or bytes of audio data, where N is a predetermined integer. By way of example, one block may contain digitized audio data corresponding to a 0.02 second long segment of the input analog audio signal. It is further assumed that subcode A is calculated on a block-by-block basis, and that subcode B is calculated on an M-block basis, where M is a specified integer. In step S21, audio features extraction system 12 receives operation parameters A, B, C, and D from system controller 14, which parameters have been set in accordance with the type of audio signal selected as discussed previously. If, in step S22, it is determined that M blocks have not yet been processed, the single block process ("1-block process") of step S27 is executed.

Figure 5:
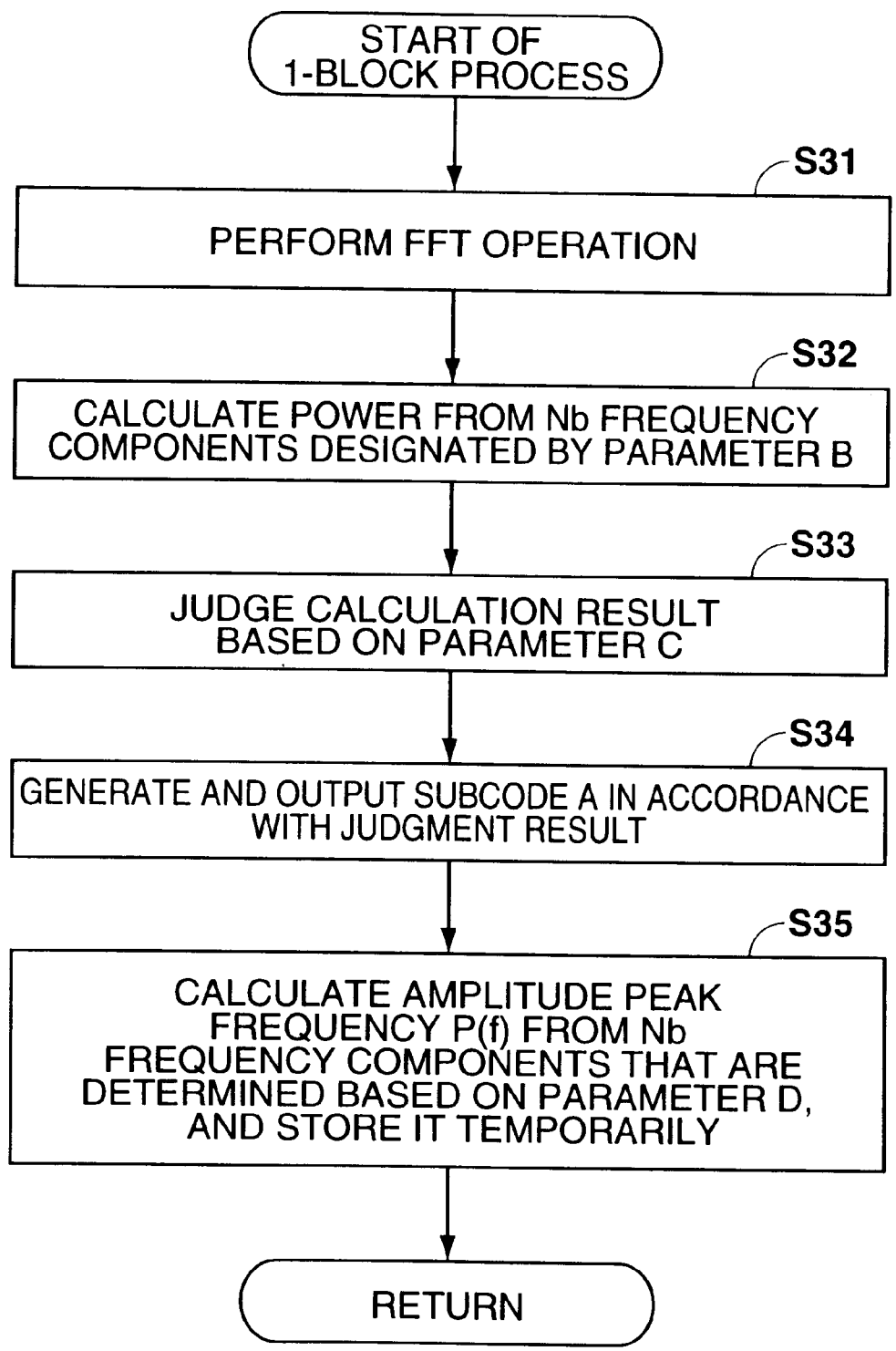

FIG. 5 is a flow chart illustrating the 1-block process. In step S31, a fast Fourier transform (FFT) is performed on a single block of the audio signal to determine the spectral components of the portion of the signal corresponding to that block. Next, in step S32, audio signal power is calculated from Nb frequency components that are specified by operation parameter B supplied from system controller 14. The portion of the input audio signal band to be used in calculating signal power is thus determined by parameter B. For example, an audio signal from a camera system includes a considerable amount of low frequency components such as zip, while an audio signal of a television broadcast includes a considerable amount of components at harmonic frequencies of the frame frequency. Hence, for the signal power calculation, noise-induced errors can be reduced by appropriately filtering out undesired frequencies in accordance with the type of audio signal being analyzed.

In the next step, S33, it is ascertained whether or not the signal is mute. That is, if the calculated power value is smaller than parameter C, the signal is determined to be mute within the associated block. Optionally, when the computed power is larger than C, a further determination can be made as to whether the signal power is within one of several predetermined ranges. In any event, subcode A is generated in step S34 in accordance with the determination of step S33, and supplied to the recording data processing system 17. Subcode A will either be of a first predetermined value for a mute condition, or one of a number of other predetermined values each corresponding to a different range of signal power levels. In general, signals of a television broadcast and of a camera system (e.g., camcorders) have different signal to noise (S/N) ratios because of differences in microphone performance. Therefore, the possibility of erroneous detection can be reduced by appropriately selecting the value of parameter C in accordance with the selected switching position of audio switching system 9 (and the control thereof by system controller 14).

The next step in the 1-block process, S35, is to determine the spectral peak P(f), i.e., the peak amplitude at any one of Nd specified frequencies, where Nd is an integer. The spectral peak so determined is then stored temporarily in memory circuit 16. The Nd frequencies are determined based on the parameter D supplied from system controller 14. As discussed above, the spectral components that add noise to the audio signal are a function of the audio signal type. Accordingly, the peak spectral power can be calculated with higher accuracy by eliminating those noise components from the subject frequency components.

Once the spectral peak P(f) for the single block is computed and stored temporarily, the software flow returns to steps S21 and S22 of FIG. 4. The process continues until step S27 is executed M times whereby spectral peaks P(f) are computed and stored in memory for M blocks of the audio signal.

Once it is determined in step S22 that M blocks of audio data have been processed, then, in step S23, the software calculates an average continuous length "$CL_{AVG}$" in which the spectral peaks P(f) are determined to be of similar levels to one another. The calculation of $CL_{AVG}$ entails comparing the spectral peaks P(f) of a sequence of blocks to one another and determining segment lengths at which the peaks of sequential blocks remain within a predefined range of one another. In step S24, it is then determined whether the computed value of $CL_{AVG}$ for that series of M blocks is larger than parameter A supplied from system controller 14. In general, the average number of blocks for computing $CL_{AVG}$ is large when the pitch of sound is relatively stable as in the case of music. Conversely, the average number of blocks is small when the audio signal comprises human speech or conversation. For the case of music, it may be determined that certain values for $CL_{AVG}$ correspond to music produced by an instrument while other values correspond to vocal music.

In any event, in step S25, a subcode B is established for each M-block segment of the audio signal as corresponding to the particular type of audio signal. In this example, it is determined whether the signal is music or not based on whether the value $CL_{AVG}$ is larger than parameter A provided by system controller 14, and subcode B is generated accordingly. The subcode B is stored in memory circuit 16 in step S26 and the process is then repeated for the next M blocks, for as long as the operating mode remains the normal recording mode. In general, signals of a television broadcast and of camera system (e.g., camcorder) have different rates of occurrence of non-music items such as conversational speech. Therefore, the possibility of erroneous detection can be reduced via appropriate selection of the value of parameter A in accordance with the type of input audio signal selected.

Returning to FIG. 3, while the audio signal is being processed in accordance with the aforedescribed control in step S3, the video is continually processed and digitally recorded as well. That is, in step S4, the compressed video output signal from video processing system 6 is transferred to recording medium 18 through recording data processing system 17 via control commands from system controller 14. System controller 14 also controls the audio processing system 11 in step S5 so that a compressed audio signal is transferred to recording medium 18 via recording processing system 17. In step S6, system controller 14 controls recording processing system 17 so that the above-discussed subcodes "A" generated by subcodes generation system 13 are supplied to recording processing system 17 and transferred to recording disk 18. Then, in step S7, if one or more subcode B has been generated, subcodes generation system 13 is instructed to transfer the same to memory circuit 16.

Thereafter, the process returns to steps S1 and S2. If the operating mode is still the normal operating mode, the aforedescribed process is repeated. If, on the other hand, the operating mode has changed such as by user depression of a "stop recording" key or the like, the routine proceeds to step S8, where it is ascertained whether the previously generated subcodes B have already been recorded onto recording medium 18. If not, system controller 14 controls subcodes generation system 13 (step S9) so as to read out subcodes B stored in memory circuit 16 and transfer them to recording medium 18 via recording data processing system 17.

In the above manner, when a transition is made from the normal recording mode to some other mode, subcodes B are recorded as a block onto a predetermined region of recording medium 18, e.g., on the U-TOC region as discussed above.

If in step S8 the subcodes B have already been recorded on recording medium 18, the next step (step S10) is to determine whether the current operating mode is a stop mode. If so, a stop process is executed in step S12. Otherwise, it is determined in step S11 whether the operating mode is a removal mode, and if so, a removal mode process is executed in step S13, and the routine returns to step S1.

Figure 6:
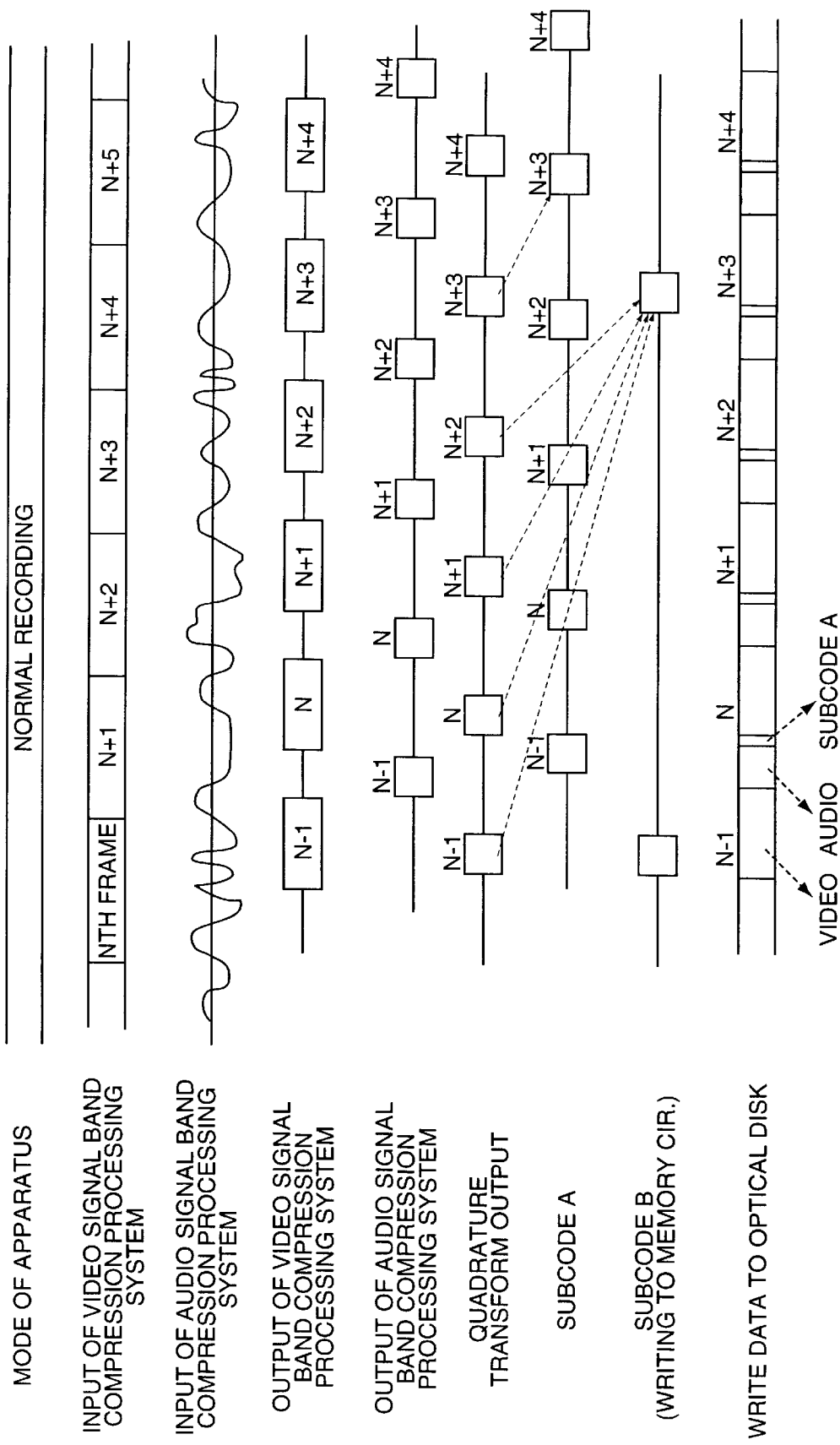
FIGS. 6 and 7 are timing diagrams showing output timing of signals flowing within the respective processing systems of FIG. 1.
Figure 7:
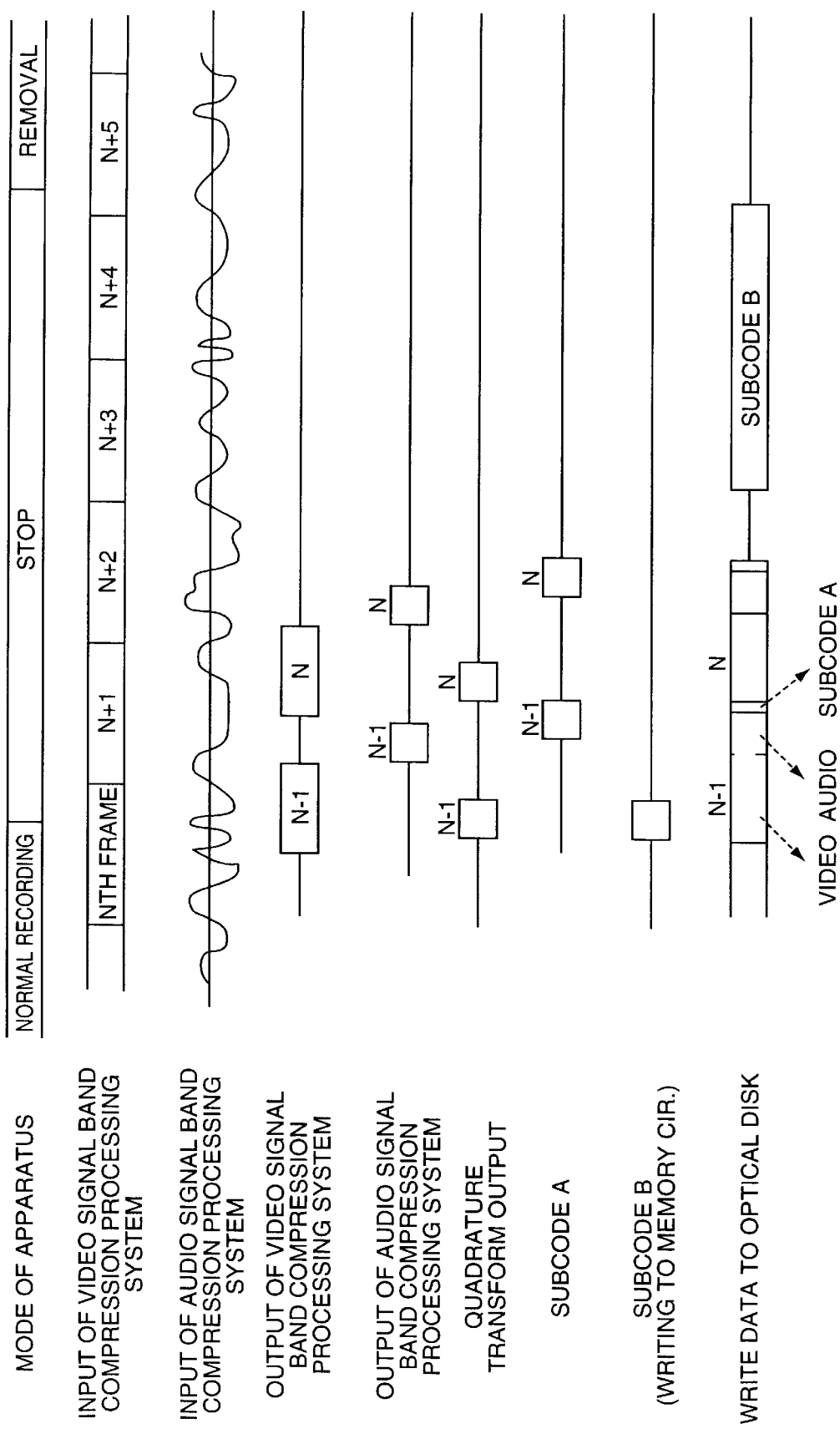

FIGS. 6 and 7 are timing diagrams showing output timing for signals of the respective audio and video processing systems. FIG. 6 shows output timing in a normal recording mode. As is apparent from the bottom-most timing bar of the figure, during the normal operating mode, the audio, video and muting data (subcode A) are recorded continually on the recording medium on a frame by frame basis. In the presently described embodiment, the compressed video data of the (N−1)st frame is recorded first, followed by the compressed audio data of the (N−1)st frame, then the subcode A for frame N−1, which is followed by the video data of the Nth frame, and so forth. It is understood that different data storing sequences may be implemented in the alternative. The other timing bars of FIG. 6 depict how the illustrative recording sequence is implemented. The compressed video data of any given frame, e.g., the Nth frame, is output from video compression system 6 just prior to the compressed audio data being output from audio compression system 11. Sufficient time needs to be allocated to perform the aforedescribed "1-block process" on the current frame, i.e., to perform a quadrature transform (e.g., FFT) on the compressed audio data, to determine subcode A and the spectral peak P(f) as described above for the frame, where one frame corresponds to a single block in this example. Thus, the quadrature transform for the Nth frame is performed prior to outputting the compressed audio data of the Nth frame, while the generation of subcode A for the Nth frame is completed immediately after the compressed audio data is outputted. Also, P(f) is stored for each frame in memory circuit 16. After M frames have been processed, e.g., four frames in the example of FIG. 6 (represented by frames N−1 to N+2) then subcode B is generated for that M frame block and written to memory circuit 16.

FIG. 7 is a timing diagram showing illustrative output timing of signals outputted from the respective processing systems as transitions are made from a normal recording mode to a stop mode, and then to a removal mode. In this example, it is assumed that the transition to the stop mode is effectuated when frame N is captured. After the compressed video and audio signals and subcodes A corresponding to frames N−1 and N are recorded onto recording medium 18, all of the subcodes B stored in memory circuit 16 are read out by subcodes generation system 13 and recorded onto recording medium 18 via the recording data processing system 17.

The particular sector configuration and format used for the subcodes A and B are not critical to the present invention. The following are presented by way of example:

Example of Sector Configuration of Subcode A:

| | |
|---|---|
| Sync pattern: | 8 bytes |
| Subcode: | 9 bytes |
| Parity: | 8 bytes |
| User data: | 2,048 bytes |
| ECC (error correcting code): | 256 bytes |
| Total: | 2,329 bytes |

Example of Format of Subcode A:

| | |
|---|---|
| Sector number: | 4 bytes |
| Audio level: | 5 bytes |
| Total: | 9 bytes |

Example of Audio Level

| | |
|---|---|
| 000: | mute |
| 001: | level-0 |
| 010: | level-1 |
| 011: | level-2 |
| . | . |
| . | . |
| . | . |
| 1XX: | level-N |

Example of Configuration of User Table of Contents (U-TOC) Including the Recorded Subcodes B:

| | |
|---|---|
| Sync pattern: | 8 bytes |
| Parity: | 8 bytes |
| User data: | 2,048 bytes |
| Subcode B: | 8,192 bytes |
| ECC (error correcting code): | 256 bytes |
| Total: | 10,512 bytes |

Example of Format of Subcode B:

| 0 sec's type: | 1 byte |
|---|---|
| 1 sec's type: | 1 byte |
| . | . |
| . | . |
| . | . |
| 8,191 sec's type: | 1 byte |
| Total: | 8,192 bytes |

In the above example, "0 sec's type" represents, for instance, the type of audio, e.g., voice, music, etc., that will be reproduced during a period of 0 through 1 seconds from the start of a reproduction, "1 sec's type" represents the audio type reproduced during a period of 1 through 2 seconds from the start, and so forth. "8191 sec's type" represents the audio type that will be reproduced during a period of 8191 to 8192 seconds from the start. For example, the audio types may be defined as follows:

Example of N Sec's Type:

000: mute

001: music-0 (e.g., instrument music)

010: music-1 (e.g., vocal music)

011: human voice (e.g., conversational speech)

1XX: other types

Accordingly, it should be readily apparent that embodiments of the invention such as recording apparatus 100 just described, are advantageously capable of receiving an analog audio or audiovisual program such as a broadcast, recording the same digitally while simultaneously analyzing the audio content as it is being recorded, and creating a user table of contents (U-TOC) characterizing the different portions of the recorded audio program. During playback, the user can advantageously employ the U-TOC (with appropriate electronics such as those to be described) to find certain portions of the recorded material, skip portions with undesired audio types, and so forth. Consequently, the user is provided with a highly efficient tool during the playback process.

Illustrative apparatuses for reproducing audio and video that have been stored along with additional audio feature information on a digital storage medium in the above-discussed manner, will now be described.

Figure 8:
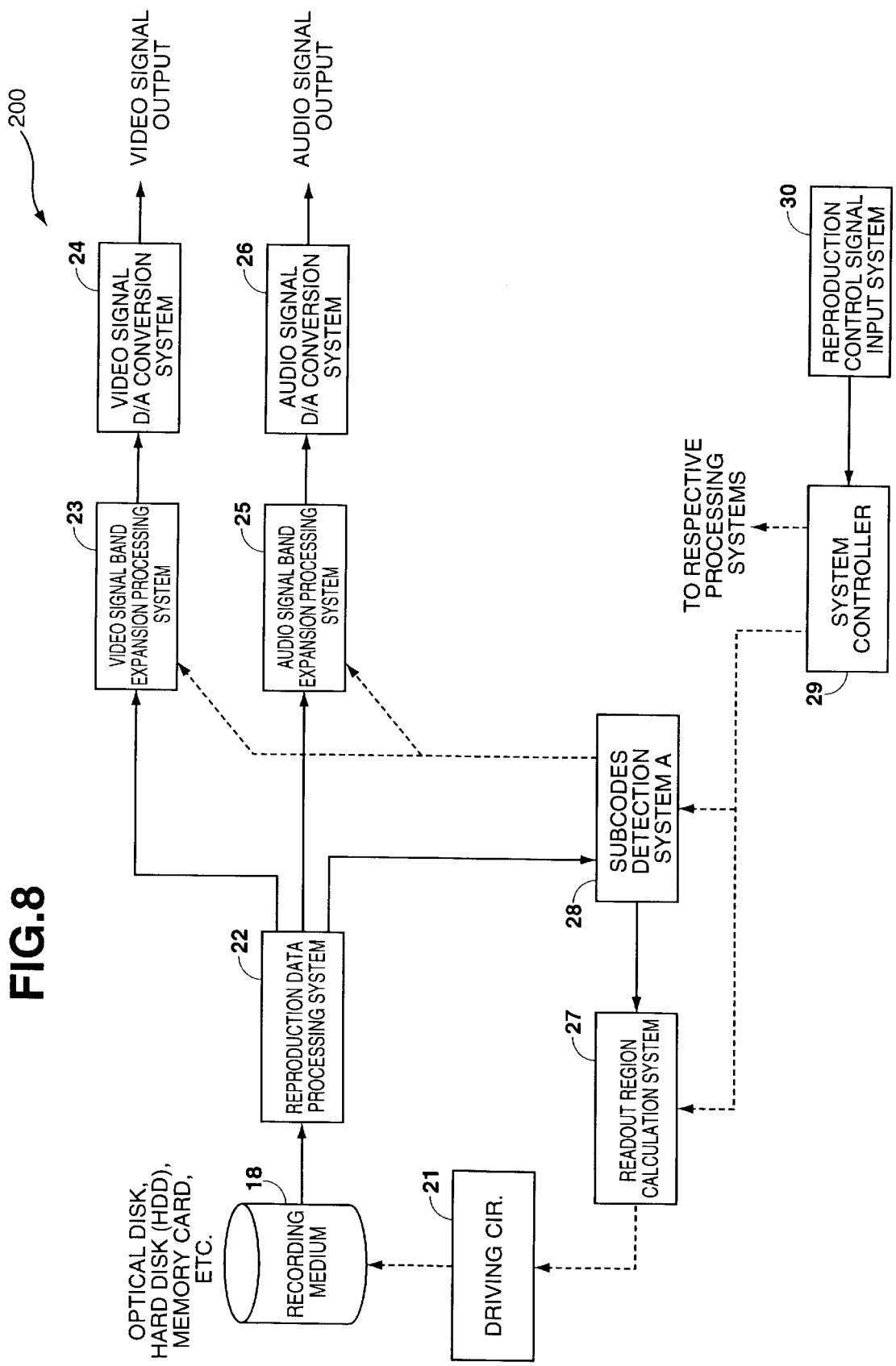
FIG. 8 is a block diagram showing an illustrative configuration of an information reproduction apparatus according to an embodiment of the invention.

FIG. 8 is a block diagram showing an illustrative configuration of an information reproduction apparatus 200 according to an embodiment of the invention. Recording medium 18 is similar to that shown in FIG. 1, e.g., an optical disk, memory card, or magnetic hard disk. Audio and video data and corresponding subcodes A and B characterizing the different time segments of the audio, are recorded on the recording medium 18. If the recording medium is an optical disk, data can be recorded according to the following format:

Example of Sector Configuration:

| Sync pattern: | 8 bytes |
|---|---|
| Subcode: | 9 bytes |
| Parity: | 8 bytes |
| User data: | 2,048 bytes |
| ECC (error correcting code): | 256 bytes |
| Total: | 2,329 bytes |

Example of Subcode Format:

| Sector number: | 4 bytes |
|---|---|
| Audio ID: | 5 bytes |
| Total: | 9 bytes |

By way of example, 5 byte audio IDs may be stored with the lowest one byte representing an audio level as follows:

| XXXX0: level-0 |
|---|
| XXXX1: level-1 |
| XXXX2: level-2 |
| XXXXA: level-N; | and the second lowest byte represents audio content in this example:

| XXX0X: mute |
|---|
| XXX1X: music (pop) |
| XXX2X: music (classic) |
| . |
| . |
| . |
| XXXAX: voice |

In the above example, X represents an arbitrary value of 0 to 255.

Although the above example is directed to the case in which a subcode is located in the same sector as video and audio data, as an alternative, a given sector may contain only subcodes. Further, as in the case of a mini-disc (MD), subcodes may be arranged as a batch in a given region such as a U-TOC region. For this case, an apparatus can be implemented by using the same configuration and processes as in the above example.

In the following discussion, reproduction apparatus 200 will be described with the assumption that recording medium 18 is an optical disk. A driving circuit 21 (in this case, an optical disk driving circuit) is configured to servo-control optical disk 18 to enable specified sectors of the disk to be accessed in response to an external control signal. An optical pickup (not shown), which may be part of reproduction processing system 22, reads out signals from disk 18, and amplifies and demodulates the same. Reproduction data processing system 22 operates to separate video data, audio data, and subcodes from data that is read out from recording medium 18, and to provide the subcodes to subcodes detection system A 28.

Video signal band expansion processing system 23 operates to expand the compressed video data supplied from processing system 22, and to convert the expanded data into a baseband signal of, e.g., 13.5 MHz, YUV, or the like. Video signal D/A conversion system 24 converts received digital video data into an analog video signal. Audio signal band expansion processing system 25 expands audio data that has been compressed according to the MPEG scheme or the like. Audio signal D/A conversion system 26 converts received digital audio data into an analog audio signal.

Readout region calculation system 27 (control means) calculates a sector number of recording medium 18 based on a control signal sent from system controller 29 or subcodes detection system A 28 (determining means). Detection system 28 is configured to determine whether subcodes (and associated frames) that are read out from recording medium 18 correspond to the audio type of a current reproduction mode. Detection system 28 supplies a control signal to calculation system 27 in accordance with this determination. Detection system 28 also provides video expansion system 23 and audio expansion system 25 with a control signal as an instruction to refrain from outputting data from a frame when that frame is to be skipped. System controller 29 is operative to control the entire recording apparatus 200 based on data input by a user through input system 30, e.g., a user panel of depressible selection keys. The various systems of apparatus 200, e.g., systems 22, 23, 25 and 27–29, may be embodied either as separate firmware or as part of a common processor with suitable software running thereon to realize the functions of the respective systems.

Operation of the above-described apparatus of FIG. 8 will now be described with reference to the flowchart of FIG. 9. In step S41, system controller 29 determines an operating mode based on user depression of one or more keys of input system 30. The operating mode may be selected from a normal reproduction mode in which audio and video data are output continuously, or, one or more "skipping" reproduction modes in which a specified audio type is skipped during reproduction. In S42, readout region calculation system 27 calculates a sector number of the next subcode to be read out. Next, in step S43, the calculated sector number is supplied to driving circuit 21, and the subcode corresponding to the calculated sector number is read out from recording medium 18 under the control of driving circuit 21. The calculated sector number and associated subcode are supplied to detection system 28 via processing system 22.

Next, in step S44, it is determined whether the current operating mode is the normal reproduction mode, and if so, the process flows to step S45, where calculation system 27 calculates the sector number of the next frame and supplies it to driving circuit 21. In step S46, compressed audio and video data corresponding to the next frame are read out from recording medium 18 under the control of driving circuit 21. This compressed video and audio data are transferred to video expansion system 23 and audio expansion system 25, respectively, via processing system 22 (steps S47, S48). The compressed video data that has been transferred to video expansion system 23 is expanded therein, then converted into an analog video signal by video D/A converter 24, and finally output. The compressed audio data that has been transferred to audio expansion system 25 is expanded therein, converted into an analog audio signal by audio D/A converter 26, and then output. The routine then returns to step S41 to repeat the foregoing process.

If, in step S44, system controller 29 determines that the current operating mode is different than the normal reproduction mode, e.g., that the mode is reproduction mode A (step S49), or reproduction mode B (step S51), then apparatus 200 is controlled to output audio and video data in accordance with the reproduction mode selected. For instance, the reproduction mode selected by the user may be designed to cause apparatus 200 to skip one particular type of audio during playback. In this case, frames are skipped if their associated subcode corresponds to the audio type to be avoided. Detection system 28 would then instruct expansion systems 23 and 25 not to output data corresponding to that frame. Concomitantly, calculation system 27 is instructed to immediately skip the sector of that frame and move on to subsequent frame sectors until a frame is found having a different subcode than the one to be avoided.

Likewise, another reproduction mode may be included to allow for playback of only one type of audio while skipping all other types. In this case, detection system 27 provides "skip" commands as described above to calculation system 27 and expansion systems 23, 25 when the current frame subcode does not correspond to the audio type selected to be played back. Yet another reproduction mode may be included which implements a specific viewing and/or listening speed inputted by the user, in which case both video and audio signals can be skipped in synchronism with one another by calculating a ratio between frames to be reproduced and frames to be skipped.

Figure 9:
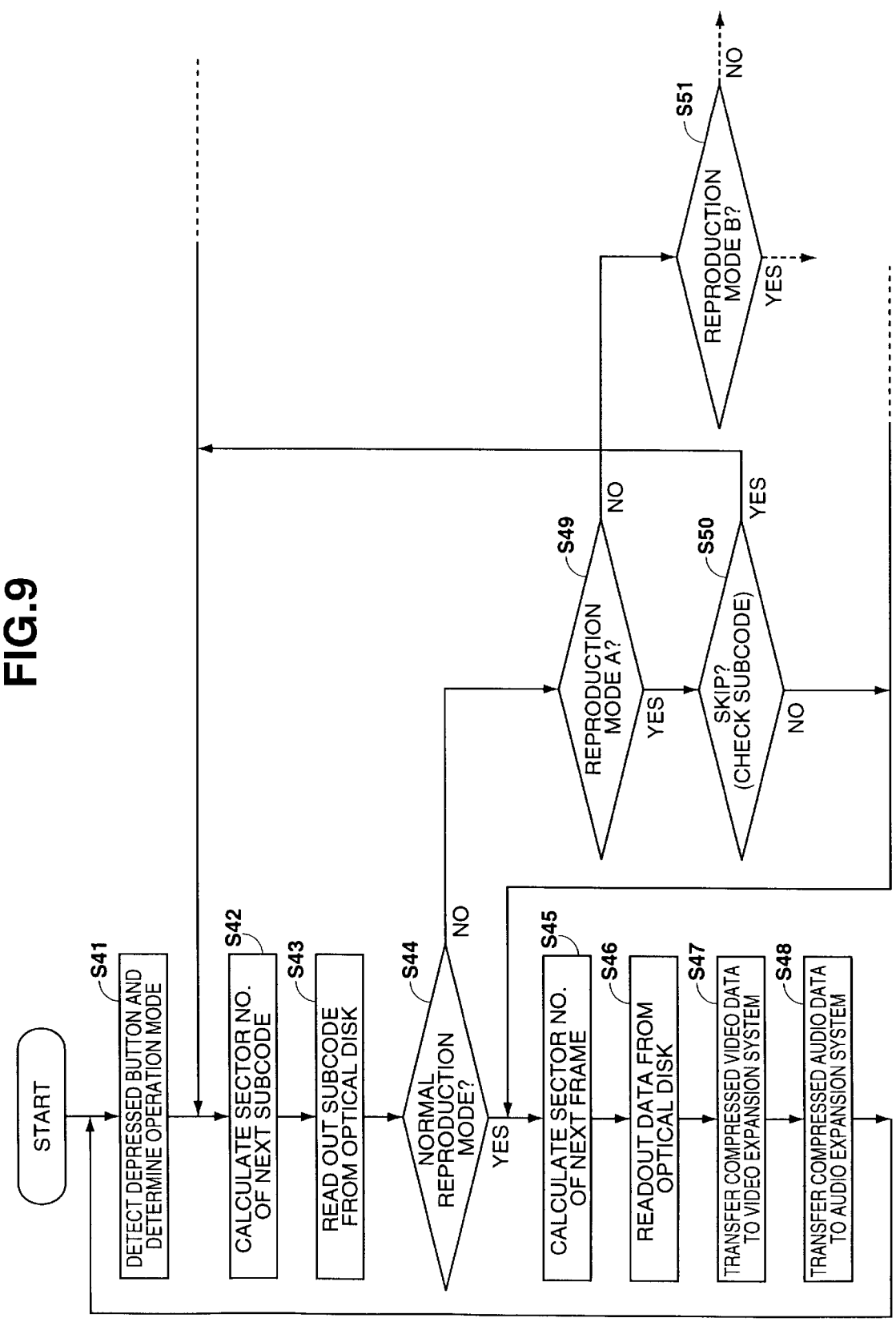
FIG. 9 is a flowchart showing the operation of the information reproduction apparatus of FIG. 8.

In the example of FIG. 9, it is assumed that reproduction mode A corresponds to a mode in which frames with muted or low level audio are to be skipped. If it is determined in step S50 that a frame is to be skipped because its subcode corresponds to a low audio level, then the routine returns to steps S42 and S43 where the sector for the subsequent frame is calculated, the subcode is read out and the process is repeated. If the frame is not to be skipped, the routine returns from inquiry S50 to step S45 to commence the playback process for the audio/video data of that frame.

As described above, a variety of reproduction operations can be performed by determining the content of a subject subcode in response to a command from system controller 29, and then calculating readout sectors based on the determination. With this technique, since a video signal and an audio signal are always skipped or reproduced in synchronism with each other, no timing deviation occurs between them.

Figure 10:
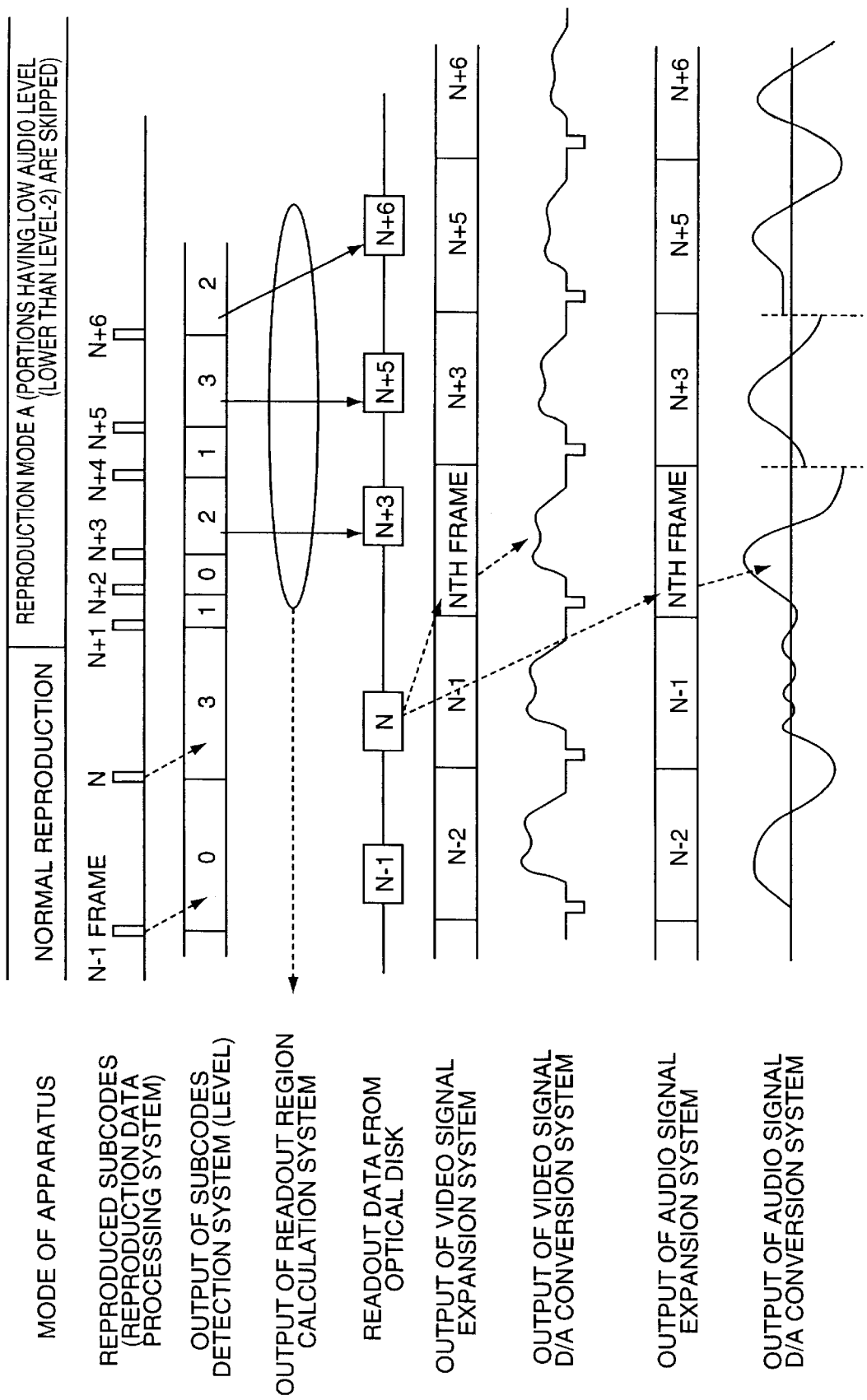
FIG. 10 is a timing diagram showing output timing of signals flowing within the respective processing systems of FIG. 8.

FIG. 10 is a timing diagram showing output timing of the signals output from respective processing systems in the normal reproduction mode and in an illustrative reproduction mode A. In the normal reproduction mode, every frame is read out irrespective of the subcode value. In reproduction mode A, frames may be skipped depending on the read-out subcode value.

In the example of FIG. 10, frames having audio levels of level-0 and level-1 are skipped, i.e., frames in which the lowest byte of the illustrative 5-byte audio ID of the subcode is "0" or "1" are skipped. Thus, frames N+1, N+2, and N+4 are skipped and frames N+3, N+5, and N+6 are read out from recording medium 18 under the control of readout region calculating system 27. Video and audio signals of the non-skipped frames, i.e., frames N+3, N+5, and N+6 in this example, are reproduced in synchronism with each other.

Figure 11:
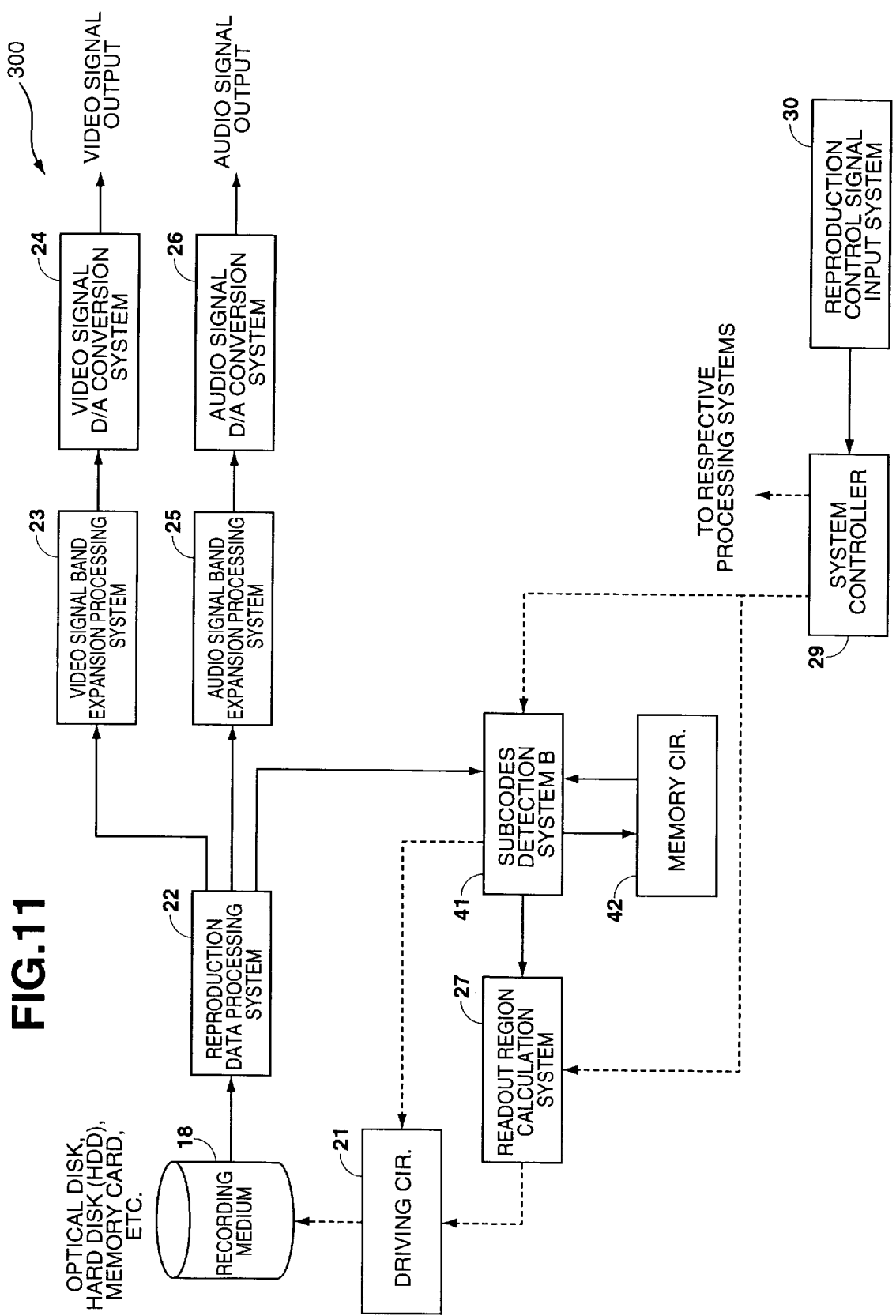
FIG. 11 is a block diagram showing an illustrative configuration of an information reproduction apparatus according to another embodiment of the invention.

FIG. 11 is a block diagram showing another illustrative configuration of an information reproduction apparatus 300, which is another embodiment of the invention. Reproduction apparatus 300 differs from the above-described apparatus 200 of FIG. 8 in that a subcode detection system B 41 in FIG. 11 is substituted for the system A 28 in FIG. 8, and a memory circuit 42 (storing means) is included in FIG. 11. Since the other components of apparatus 300 and the operation thereof are the same as the corresponding components of apparatus 200, descriptions thereof will be omitted.

Subcodes detection system B 41 is configured to read out subcodes that are recorded on the recording medium 18 and then store those subcodes in memory circuit 42. Preferably, these subcodes are read out from recording medium 18 as a block during an allocated time interval. System 41 also operates to receive a "reproduction mode" control signal from system controller 29 indicative of which audio data is to be reproduced (or skipped). In response, system 41 reads out subcodes stored in memory 42 and determines whether to reproduce the audio/video data of a given frame based on a comparison of that frame's associated subcode with the reproduction mode selected. System 41 then controls readout region calculation system 27 in accordance with the comparison.

Memory circuit 42 is a semiconductor memory device or the like, such as a random access memory, and, by way of example, may be stored with the following subcodes:

| Address | Data |
|---------|------|
| 0000    | 0th-frame subcode |
| 0001    | 1st-frame subcode |
| .       | . |
| .       | . |
| .       | . |
| XXXX    | Nth-frame subcode |

Operation of reproducing apparatus 300 will now be described with reference to the flowchart of FIG. 12. At the start (step S61), subcodes detection system B 41 reads out all subcodes stored on recording medium 18, and transfers the subcodes to memory 42 for storage. The subcode readout process is effectuated by system 41 providing control commands to calculation system 27, which in turn provides control signals to driver circuit 21 for accessing the proper region of the disk.

Next, in step S62, an operating mode is determined based on data input via a user key depression through input system 30. In step S63, detection system 41 reads out a subcode of a specific frame from memory 42, i.e., the next frame in a reproduction sequence to be selected as a candidate for possible playback of audio/video data. If in step S64, the current operating mode is determined to be the normal reproduction mode, the subcodes are irrelevant since no frames are skipped. In this case, calculation system 27 calculates a sector number of the next frame and driving circuit 21 is controlled accordingly (step S65). Audio/video data of the next frame is then read out from recording medium 18 and supplied to reproduction data processing system 22 (step S66). Processing system 22 then separates the audio data from the video data, transfers the audio data to expansion system 25 and the video data to expansion system 23 (steps S67, S68). The signals are expanded in the respective expansion systems 23, 25, converted to analog signals by respective D/A converters 24, 26 and then output. The process is then repeated for the subsequent frames.

If, in step S64, system controller 29 determines that the current operating mode is different than the normal reproduction mode, e.g., reproduction mode A (step S69) or reproduction mode B (step S71), then apparatus 300 is controlled to output audio and video data in accordance with the reproduction mode selected. For instance, as was the case for recording apparatus 200, some of the alternative reproduction modes may be designed to cause apparatus 300 to skip a particular type of audio during playback. In this case, frames are skipped if their associated subcode corresponds to the audio type to be avoided. Another reproduction mode may be included to allow for playback of only one type of audio while skipping all other types. Yet another reproduction mode may be included which implements a specific viewing and/or listening speed inputted by the user, as mentioned previously.

Figure 12:
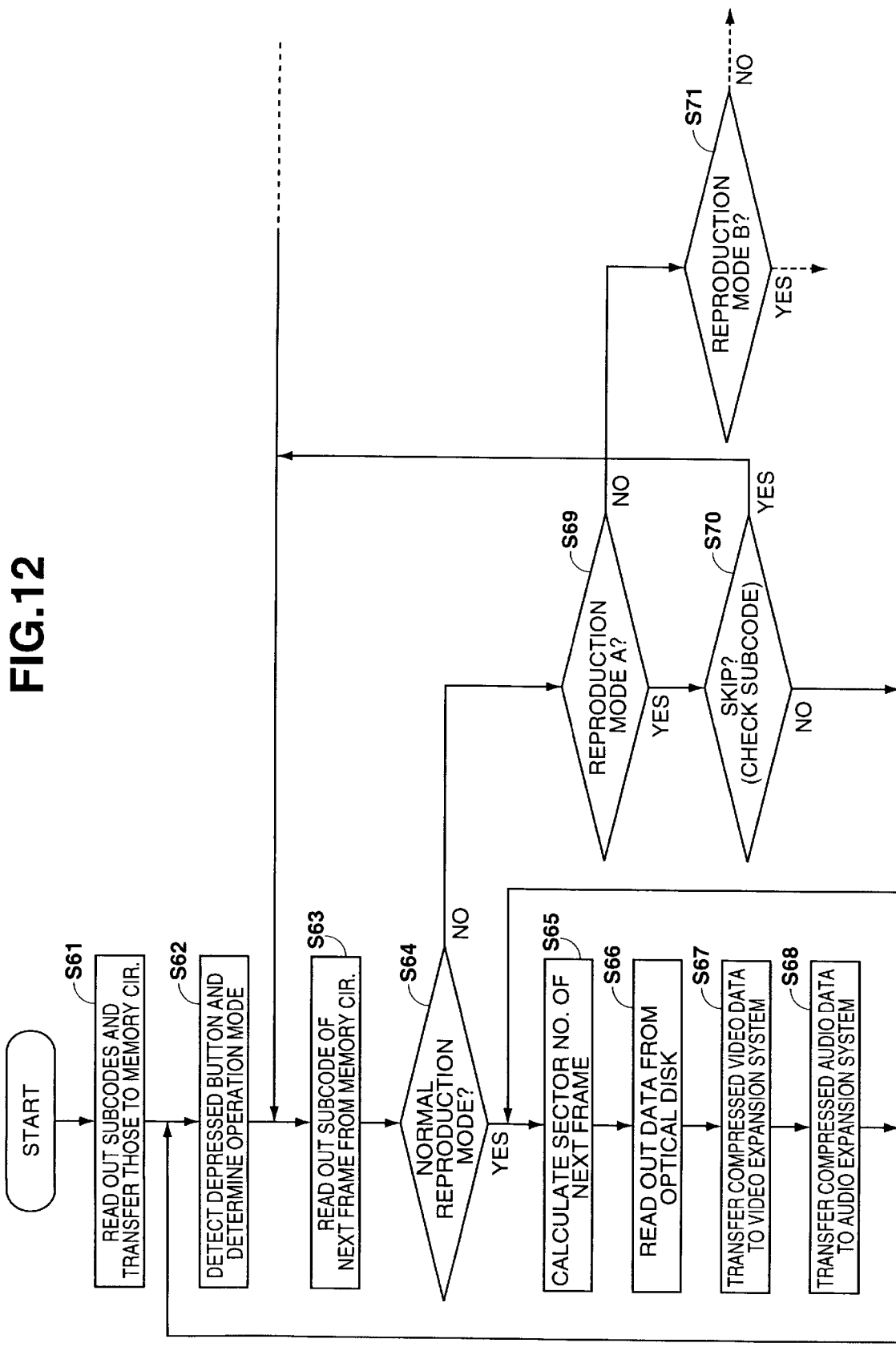
FIG. 12 is a flowchart illustrating the operation of the information reproduction apparatus of FIG. 11.

In the example of FIG. 12, if it is determined in step S70 that a frame is to be skipped based on a positive correlation with its subcode and reproduction mode A (e.g., mute condition skipping or vocal song skipping, etc.) then the routine returns to step S63 where the subcode from the subsequent frame is read out and the process is repeated. If the frame is not to be skipped, the routine returns to step S65 to commence the playback process for the audio/video of that frame as described above.

FIG. 13 is a timing diagram illustrating the timing of signals that are output from the respective processing systems in making a transition from a normal reproduction mode to reproduction mode A. When the apparatus is initially powered up or a new optical disk is inserted, etc., subcodes are initially read out as a block in a subcodes readout mode. In the normal reproduction mode, a subcode corresponding to a current frame to be played back is read out from memory circuit 42, and video and audio data of that frame are read out from recording medium 18. The video data is supplied to and expanded by video expansion system 23, then converted into an analog video signal by video D/A converter system 24, and finally output. The audio data is supplied to and expanded by audio expansion system 25, then converted into an analog audio signal by D/A converter 26 for outputting.

In reproduction mode A, frames having subcodes indicating audio levels lower than a specified level are skipped during playback. In this example, frames whose audio levels are lower than level-2 are skipped while frames with audio levels higher than level-1 are reproduced. Since video data and audio data are skipped in synchronism with each other, reproduced video and audio signals are also synchronized with one another.

It is understood that the above-described embodiments of recording and reproduction apparatuses can be modified in a variety of ways without departing from the spirit and scope of the invention. For example, while the above embodiments specifically illustrate discrimination between two classes of audio—low level audio and music—the embodiments can be modified to allow for discrimination among three or more types of audio. Further, instead of detecting one spectral peak P(f) for each block in the computation for discriminating between music and non-music, the discrimination may alternatively be performed by detecting a plurality of spectral peaks relative to the highest level for each block, and calculating their continuity, e.g., over M blocks. As another alternative, the discrimination between music and non-music and/or between muted and non-muted audio may be made by using one of various, currently proposed speech recognition devices, with the discrimination result being recorded as a subcode.

Further, while the above embodiments are directed to the case in which skips are effected on a frame-by-frame basis, in the audio system the amount of noise due to switching between frames can be minimized by performing crossfading before and after each skip. Alternatively, switching can be controlled by detecting zero-cross points.

Moreover, in the above embodiments, playback and skipping are controlled on a frame-by-frame basis based on subcode contents. However, playback of a short audio/video segment, for instance, a one or two-frame segment, may be recognized in many cases merely as noise. This problem can be solved by setting in advance the minimum continuous sequence of frames to be played back. Then, frames would be played back, rather than skipped, so long as the minimum sequence has not yet been reached, even if their subcodes indicate a skip.

As another modification, subcode A (which is indicative of the audio level feature) may be generated for every two frames rather than for every frame as described. Further, another reproduction mode based on subcode A may be included which allows a user to automatically skip louder portions (higher levels) of the audio signal, e.g., loud music, while playing back audio at lower levels.

Further, although the above embodiments are directed to the application of using subcodes relating to audio level and music, various forms of reproduction can be realized by generating subcodes indicating other audio features such as a subcode for identification of a speaker.

While the present invention has been particularly shown and described in conjunction with preferred embodiments thereof, it will be readily appreciated by those of ordinary skill in the art that various changes may be made to the disclosed embodiments without departing from the spirit and the scope of the invention. Therefore, it is intended that the appended claims be interpreted as including the embodiments described herein as well as all equivalents thereto.

What is claimed is:

1. An information recording apparatus for recording at least an audio signal onto a recording medium, comprising:

detecting means for performing a quadrature transform on the audio signal periodically at a predetermined time interval, and detecting a feature of the audio signal by determining a correlation between resulting energy components and energy distribution, wherein the feature is detected as music if a predetermined condition is satisfied; and recording means for recording additional information that corresponds to said detected feature onto the recording medium together with the audio signal.

2. The information recording apparatus according to claim 1, wherein said recording means further records a video signal associated with the audio signal onto said recording medium together with the audio signal and said additional information.

3. The information recording apparatus according to claim 1, wherein said recording means records, in a distributed manner, the audio signal and said additional information in a common region of said recording medium.

4. The information recording apparatus according to claim 3, wherein said additional information is recorded for each of a plurality of blocks of the audio signal.

5. The information recording apparatus according to claim 1, wherein said additional information is recorded in a predetermined region of said recording medium that is different from a region in which at least the audio signal is to be recorded.

6. The information recording apparatus according to claim 5, wherein all said additional information is recorded in said predetermined region during a time interval in which said audio signal is not being recorded.

7. The information recording apparatus according to claim 1, wherein said detecting means detects the feature as music if an average continuous length of spectral peaks that are within a predetermined amplitude range of one another, is greater than a specified value.

8. The information recording apparatus according to claim 1, further comprising an input switch for receiving plural types of analog audio signals and providing said audio signal at an output thereof in accordance with a selected switching state, and wherein said detecting means detects the feature of the audio signal in accordance with operational parameters set as a function of the type of analog audio signal selected.

9. The information recording apparatus according to claim 1, wherein said detecting means further detects specific features of said audio signal of vocal music, instrumental music and speech and records said additional information in accordance with said detection.

10. An information recording method for recording at least an audio signal onto a recording medium, comprising the steps of:

detecting a feature of the audio signal by performing a quadrature transform on the audio signal periodically at a predetermined time interval, and detecting said feature of the audio signal by determining a correlation between resulting energy components and energy distribution, wherein the feature is detected as music if a predetermined condition is satisfied; and recording additional information that corresponds to the detected feature onto the recording medium together with the audio signal.

11. A recording apparatus for digitally recording at least an audio signal onto a recording medium, comprising:

an audio features extraction system configured to detect a feature of each of a plurality of time segments of the audio signal by performing a quadrature transform on the audio signal periodically at a predetermined time interval, and determining a correlation between resulting energy components and energy distribution, wherein the feature is detected as music if a predetermined condition is satisfied; and a recording processing system for recording feature information identifying said detected feature of each said time segment of the audio signal onto the recording medium together with data corresponding to the audio signal.

12. The recording apparatus according to claim 11, wherein the recording processing system is further operative to record a video signal corresponding to the audio signal onto the recording medium together with the audio signal and said feature information.

13. The recording apparatus according to claim 11, wherein the recording processing system records, in a distributed manner, said feature information in a region of the recording medium in which at least the audio signal is to be recorded.

14. The recording apparatus according to claim 11, wherein said audio features extraction system is further configured to detect the existence of a low audio power level feature of each of said time segments of said audio signal, said recording processing system recording information indicative of said detected low audio power level feature for respective time segments onto said recording medium.

15. The recording apparatus according to claim 11, wherein said feature information is recorded in a predetermined region of the recording medium that is different from a region in which at least the audio signal is recorded.

16. The recording apparatus according to claim 15, wherein all of said detected features are recorded in the predetermined region during a time interval in which said audio signal is not being recorded on said recording medium.

17. The recording apparatus according to claim 12, wherein each of said time segments comprises at least one frame of the audio and video signal.

18. The recording apparatus according to claim 17, wherein said audio features extraction system is operative to detect an audio level feature for each of a first predetermined set of frames and to detect an audio type feature for each of a second predetermined set of frames larger than said first predetermined set of frames.

19. The recording apparatus according to claim 18, wherein said first predetermined set of frames comprises a single frame.

20. The recording apparatus according to claim 11, further comprising in combination therewith, a reproduction system for selectively reproducing said time segments of said audio signal based on a correlation of said feature information for individual ones of said segments and a selected reproduction mode associated with at least one of said features.

21. The recording apparatus according to claim 20 wherein said selected reproduction mode is a mode in which only audio signals having a particular feature are reproduced while other audio signals are skipped.

22. The recording apparatus according to claim 20 wherein said selected reproduction mode is a mode in which only audio signals without a particular feature are reproduced while other audio signals are skipped.

23. A recording method for digitally recording at least an audio signal onto a recording medium, comprising the steps of:

detecting a feature of each of a plurality of time segments of the audio signal by performing a quadrature transform on the audio signal periodically at a predetermined time interval, and determining a correlation between resulting energy components and energy distribution, wherein the feature is detected as music if a predetermined condition is satisfied;

generating feature information identifying said detected feature of each said time segment of the audio signal; and recording said feature information onto said recording medium together with data corresponding to the audio signal.

* * * * *